(12) United States Patent
Lam et al.

(10) Patent No.: US 10,401,831 B2
(45) Date of Patent: *Sep. 3, 2019

(54) POS SYSTEM WITH LIFE-PERCENTAGE DISPLAYING AND PROMPTING FUNCTION

(71) Applicant: FLYTECH TECHNOLOGY CO., LTD, Taipei (TW)

(72) Inventors: Tai-Seng Lam, Taipei (TW); Chiung-Chi Lin, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 98 days.

This patent is subject to a terminal disclaimer.

(21) Appl. No.: 15/689,380

(22) Filed: Aug. 29, 2017

(65) Prior Publication Data

US 2017/0364057 A1    Dec. 21, 2017

Related U.S. Application Data

(63) Continuation-in-part of application No. 15/048,299, filed on Feb. 19, 2016, now abandoned.

(30) Foreign Application Priority Data

Dec. 29, 2015    (TW) .............................. 104144276 A

(51) Int. Cl.
*G06F 11/30*     (2006.01)
*G05B 19/4065*   (2006.01)
(Continued)

(52) U.S. Cl.
CPC ..... *G05B 19/4065* (2013.01); *G05B 19/0423* (2013.01); *G06F 1/263* (2013.01); *G06F 11/008* (2013.01); *G06F 11/3452* (2013.01);
*G06Q 10/0631* (2013.01); *G06Q 10/20* (2013.01); *G06Q 20/20* (2013.01); *G06Q 20/32* (2013.01); *G07G 1/01* (2013.01); *G07G 1/12* (2013.01);
(Continued)

(58) Field of Classification Search
CPC ................................. G06F 1/30; G06F 1/3203
USPC ....................................................... 713/340
See application file for complete search history.

(56) References Cited

U.S. PATENT DOCUMENTS 6,490,543 B1 * 12/2002 Jaw ..................... G05B 19/4065
                                                             340/457.4
6,813,526 B1 * 11/2004 Dodd, Jr. ........... G05B 19/0423
                                                             700/65

(Continued)

*Primary Examiner* — Volvick Derose
(74) *Attorney, Agent, or Firm* — WPAT, PC

(57) ABSTRACT

A POS system includes a plurality of electronic device, at least a specified one of which automatically generates and updates a history data at intervals, and an intelligent device installed in the specified electronic device for automatically updating and showing a life percentage information of the specified electronic device according to the history data. The intelligent device includes: a signal transmission module electrically connected to the specified electronic device for receiving the history data therethrough; a processing unit generating a life percentage value according to the history data of the specified electronic device, and issuing a life percentage status signal indicative of the life percentage value; a storage module for storing the history data; and a prompt displaying module visibly disposed for displaying the life percentage information in response to the life percentage status signal.

9 Claims, 4 Drawing Sheets

(51) Int. Cl.
*G05B 19/042* (2006.01)
*G06F 11/34* (2006.01)
*G06F 11/00* (2006.01)
*G06F 1/26* (2006.01)
*G06Q 10/06* (2012.01)
*G06Q 10/00* (2012.01)
*G06Q 20/20* (2012.01)
*G06Q 20/32* (2012.01)
*G07G 1/01* (2006.01)
*G07G 1/12* (2006.01)
*G06F 1/3203* (2019.01)
*G06F 1/30* (2006.01)

(52) U.S. Cl.
CPC ............... *G05B 2219/31121* (2013.01); *G05B 2219/34038* (2013.01); *G05B 2219/37249* (2013.01); *G06F 1/30* (2013.01); *G06F 1/3203* (2013.01)

(56) References Cited

U.S. PATENT DOCUMENTS

| | | | | |
|---|---|---|---|---|
| 2002/0082896 A1* | 6/2002 | Inagi | ...................... | G06Q 10/06 705/7.18 |
| 2002/0108439 A1* | 8/2002 | Whitehead | ............... | G01D 7/12 73/290 V |
| 2003/0095278 A1* | 5/2003 | Schwartz | ............... | G03G 15/55 358/1.14 |
| 2003/0101257 A1* | 5/2003 | Godwin | ................ | G06Q 20/20 709/223 |
| 2004/0140908 A1* | 7/2004 | Gladwin | ................... | G01D 4/00 340/870.02 |
| 2005/0006468 A1* | 1/2005 | Fandel | ................... | G06Q 20/20 235/383 |
| 2005/0171898 A1* | 8/2005 | Bishop | ................... | G06Q 20/00 705/39 |
| 2005/0224577 A1* | 10/2005 | Rozenblat | ............. | G06Q 10/06 235/385 |
| 2010/0012715 A1* | 1/2010 | Williams | ................. | G06Q 20/32 235/375 |
| 2012/0077433 A1* | 3/2012 | Walker | ................ | H04M 1/7253 455/41.1 |
| 2013/0132775 A1* | 5/2013 | Onoue | ................. | G06Q 10/063 714/33 |
| 2014/0041008 A1* | 2/2014 | Roskind | ................. | G06F 21/316 726/8 |
| 2014/0218039 A1* | 8/2014 | Shen | ................. | H05B 33/0884 324/414 |
| 2014/0372755 A1* | 12/2014 | Ristock | ................. | H04L 47/286 713/168 |
| 2015/0012169 A1* | 1/2015 | Coard | ................. | G06Q 20/202 701/29.1 |
| 2016/0109825 A1* | 4/2016 | Webb | ................. | G03G 15/0856 399/61 |

\* cited by examiner

POS SYSTEM WITH LIFE-PERCENTAGE DISPLAYING AND PROMPTING FUNCTION

The present application is a continuation-in-part application claiming benefit from a pending U.S. patent application bearing a Ser. No. 15/048,299 filed on Feb. 19, 2016, which claims the benefit of foreign priority to Taiwan application 104144276 filed on Dec. 29, 2015, the contents of which are incorporated herein by reference.

FIELD OF THE INVENTION

The present invention relates to a POS system, and more particularly to a POS system with a life-percentage displaying and prompting function.

BACKGROUND OF THE INVENTION

With the popularity of the selling system in business, electronic devices of a point-of-sale (POS) system are used in various stores or business to manage goods purchase, goods sale, good return, fees and other information. For example, electronic devices of the POS system include a host, a monitor, a printer, and so on. When the electronic device needs to be replaced, the user has to notify the engineer of the original factory to replace the components of the electronic device.

Generally, the user has to make an appointment with the maintenance engineer to acquire the maintenance service. Consequently, the problems of the electronic device cannot be solved immediately. In other words, the conventional technology is not user-friendly. For example, the electronic device for the POS system is an important business tool in the store or the business place. The electronic device for the POS system is used to calculate the number or items of the business products and gather statistics about the turnover and other data in the same day. If the electronic device is abnormal and the abnormal situation fails to be eliminated in advance or immediately, the selling process is not smooth. Under this circumstance, the operating loss in business increases.

SUMMARY OF THE INVENTION

For solving the drawbacks of the conventional technologies, the present invention provides a POS system with a life-percentage displaying and prompting function.

In accordance with an aspect of the present invention, a POS system comprises: a plurality of electronic device, at least a specified one of which automatically generates and updates a history data at intervals; and an intelligent device installed in the specified electronic device for automatically updating and showing a life percentage information of the specified electronic device according to the history data. The intelligent device includes: a signal transmission module electrically connected to the specified electronic device for receiving the history data therethrough; a processing unit generating a life percentage value according to the history data of the specified electronic device, and issuing a life percentage status signal indicative of the life percentage value; a storage module for storing the history data; and a prompt displaying module visibly disposed for displaying the life percentage information in response to the life percentage status signal.

In an embodiment, the POS system further comprises a first power device and a second power device, wherein electricity to the specified electronic device is exclusively provided by the first power device, and electricity to the intelligent device is exclusively provided by the second power device.

In an embodiment, the history data is daily updated and stored into the storage module at one or more designated time points. Alternatively, the history data may be updated and stored into the storage module at regular intervals.

In an embodiment, the prompt displaying module includes at least one light emitting diode, whose color dynamically changes with the life percentage value. Alternatively, the prompt displaying module includes a row of light emitting diodes, a turned-on ratio of which changes with the life percentage value.

The life percentage information may indicate a spent life percentage or a residual life percentage.

In an embodiment, the intelligent device further comprises a wireless transmission module in wireless connection with a mobile device, wherein the life percentage status signal is transmitted from the intelligent device to the mobile device through the wireless transmission module automatically by the intelligent device at intervals or in response to a request from the mobile device triggered by a user, so that the life percentage information of the specified electronic device is shown on the mobile device.

In accordance with another aspect of the present invention, a POS system comprises: a plurality of electronic devices; and an intelligent device in communication with the electronic devices, automatically updating and showing a life percentage information of the POS system according to a history data collected from the plurality of electronic devices. The intelligent device includes: a signal transmission module in communication with the electronic devices for receiving the history data therethrough; a processing unit generating life percentage values according to the history data of the electronic devices, and issuing a life percentage status signal according to the life percentage values; and a prompt displaying module visibly disposed for displaying the life percentage information in response to the life percentage status signal.

In accordance with a further aspect of the present invention, a POS system comprises: a plurality of electronic device, at least a specified one of which automatically generates and updates a history data at intervals; and an intelligent device installed in the specified electronic device for automatically updating and showing a life percentage information of the specified electronic device according to the history data. The intelligent device includes a signal transmission module electrically connected to the specified electronic device for receiving the history data therethrough; a processing unit generating a life percentage value according to the history data of the specified electronic device, and issuing a life percentage status signal indicative of the life percentage value; and a wireless transmission module in wireless connection with a mobile device, wherein the life percentage status signal is transmitted from the intelligent device to the mobile device through the wireless transmission module automatically by the intelligent device at intervals or in response to a request from the mobile device triggered by a user, so that the life percentage information of the specified electronic device is shown on the mobile device.

From the above descriptions, the present invention provides a system for displaying and prompting a life percentage information of an electronic device. An intelligent device is used for reading a history data of the electronic device and calculating a life percentage value corresponding to the electronic device according to the history data. Moreover, the intelligent device generates a life percentage status signal according to the life percentage value, and displays the life percentage information of the electronic device through a prompt displaying module. Consequently, the life percentage of the electronic device can be realized by the user. In practice, the system is further equipped with a mobile device. When an application program in the mobile device is executed, the life percentage status signal of the corresponding electronic device is read by the mobile device at a near side. Moreover, the life percentage information of the electronic device is clearly shown on a user interface. Consequently, the system of the present invention can facilitate the user to realize the life percentage of the electronic device and facilitate the user to judge whether the electronic device needs to be replaced with a new one.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
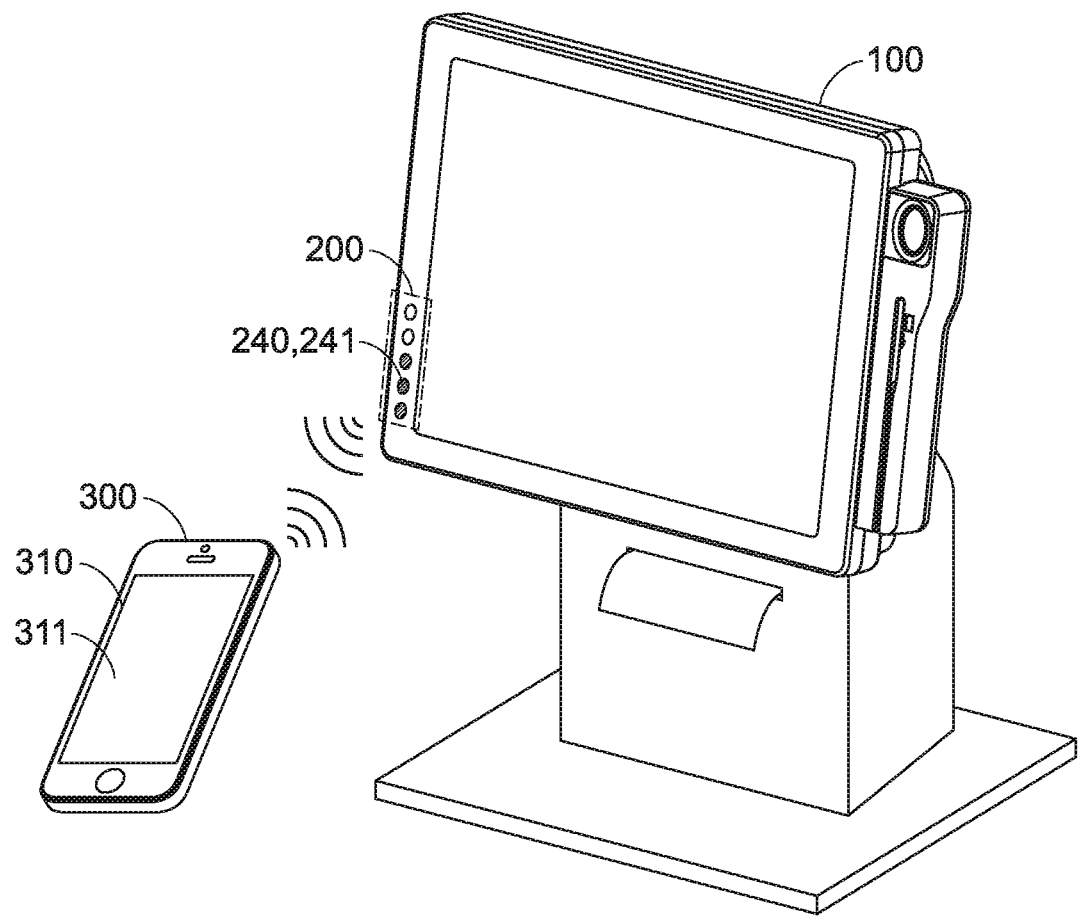
FIG. 1 is a perspective diagram which schematically illustrates a POS system according to an embodiment of the present invention, in which a life percentage information of an electronic device can be prompted and displayed.
Figure 2:
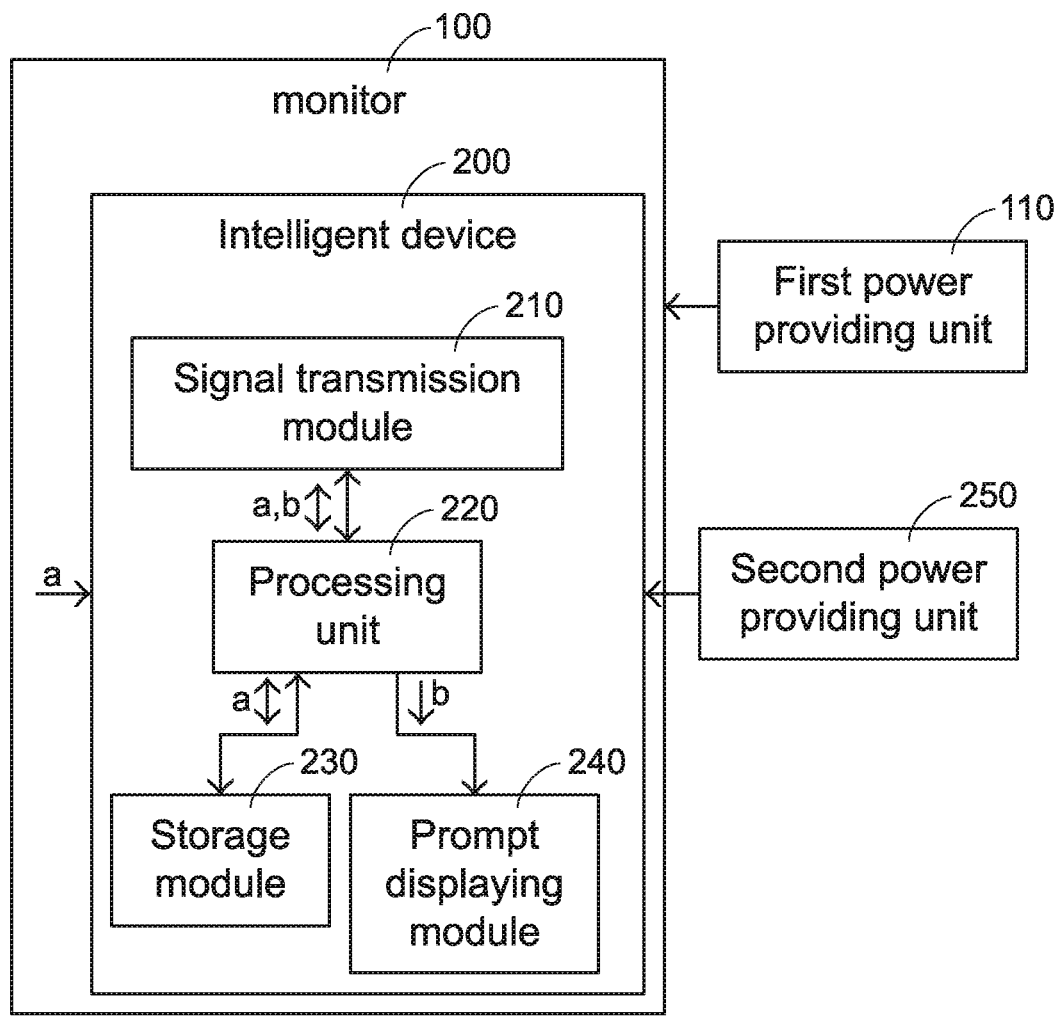
FIG. 2 is a schematic functional block diagram illustrating the displaying and prompting system of FIG. 1.

FIG. 1 schematically illustrates an architecture of a point-of-sale (POS) system according to an embodiment of the present invention, wherein the POS system includes a variety of electronic devices, and a life percentage information of at least one of the electronic device can be displayed and prompted. FIG. 2 is a schematic functional block diagram illustrating the POS system of FIG. 1, in which one of the electronic devices is exemplified.

In the embodiment as shown in FIGS. 1 and 2, the POS system 10 comprises a monitor 100, whose life percentage information is to be displayed and prompted, and a variety of other electronic devices (not shown), whose life percentage information may also be respectively displayed and prompted. Hereinafter, how the life percentage information of the monitor 100 is displayed and prompted is exemplified for describing the operational principle of the present invention. Corresponding to the monitor 100, an intelligent device 200 is provided. The electric power of the monitor 100 is supplied with a first power device 110. The intelligent device 200 is installed in the monitor 100, and comprises a signal transmission module 210, a processing unit 220, a storage module 230, and a prompt displaying module 240. The electric power of the intelligent device 200 is supplied with a second power device 250, which is independent from the first power device 110, and supplies power for the elements included in the intelligent device 200.

For facilitating a user to know the life percentage of the monitor 100 at any time, a history data "a" of the monitor 100 is collected and stored in the storage module 230 of the intelligent device 200, and periodically and/or dynamically updated. The processing unit 220 processes the history data "a" to estimate a life percentage value, and generates and outputs a life percentage status signal b accordingly to the prompt displaying module 240. With the prompt displaying module 240, the life percentage information of the monitor 100 is shown on the monitor 100 so that the user can easily understand the life condition of the monitor 100.

In addition to the monitor, any other suitable electronic device of the POS system may have its own life percentage information revealed in front of the user in a similar manner. The electronic device, for example, may be a host, a printer, a hard disk drive or any other suitable peripheral device, in addition to the monitor. The history data "a" contains, for example, a product serial number, a maintenance record information, an operating temperature information, a usage time information and at least one setting parameter of the electronic device. For example, the operating temperature information may be the temperature variation, average temperature or temperature range of the electronic device in a working mode. The usage time information, for example, is determined according to the type of the electronic device. Taking again the monitor as an example of the electronic device, the usage time information may be time span that the monitor has cumulatively worked for displaying images. In another example that the electronic device is a host, the usage time information may be time span that the host has been cumulatively in a powered-on state. In a further example that the electronic device is a hard disk drive, the usage time information of the hard disk drive may be a time span that the hard disk drive has been cumulatively in an electronically conducted state. The setting parameter is also determined according to the type of the electronic device. For example, the setting parameter of a hard disk drive includes the number of times the hard disk drive has been cumulatively accessed; and the setting parameter of a monitor includes the number of times the monitor has been cumulatively touched and a brightness value of the monitor.

Figure 3A:
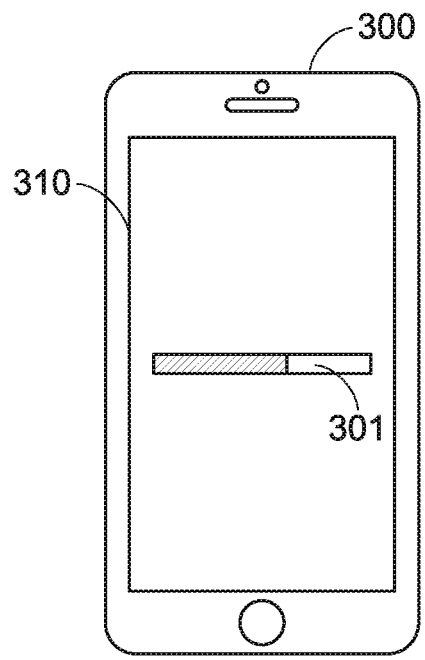
FIG. 3A is a schematic diagram illustrating a life percentage information displayed by a mobile device according to another embodiment of the present invention.

Generally, the prompt displaying module 240 of the intelligent device 200 is uncovered by a housing of the electronic device in order to be observed. If the electronic device is a hidden electronic device, e.g. a hard disk drive, the prompt displaying module 240 may be separately disposed but kept in communication with other elements of the electronic device. For example, the prompt displaying module 240 may be disposed on the monitor 100 so that the life percentage of the electronic device can be visibly realized by the user. Alternatively, the life percentage information of the electronic device can be displayed by a mobile device 300 on a display screen 310 thereof, e.g. by way of a sliding bar 301, as illustrated in FIG. 3A. Of course, the life percentage information may be displayed on both the monitor 100 and the display screen 310 of the mobile device 300, if necessary.

Figure 3B:
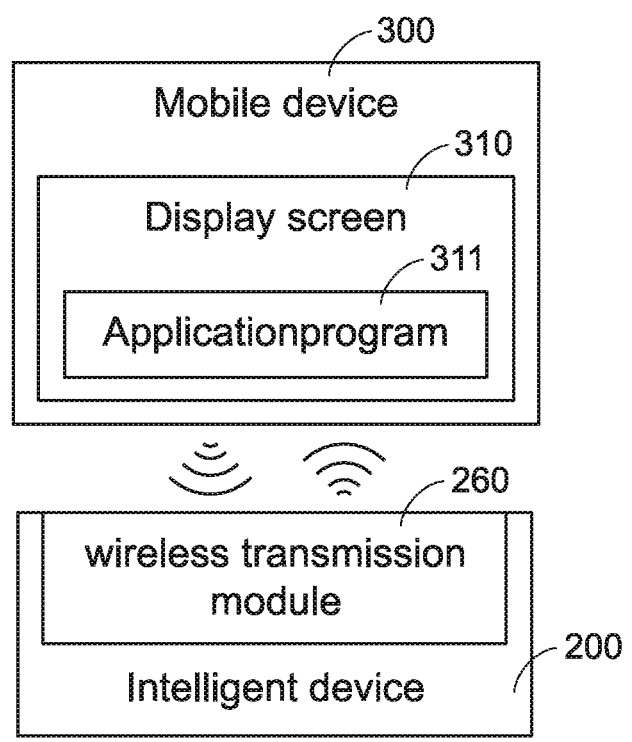
FIG. 3B is a schematic functional block diagram illustrating wireless communication between the mobile device and the intelligent device of FIG. 1.

For displaying the life percentage information of the electronic device on the display screen 310, the intelligent device 200 and the mobile device 300 are in communication with each other, as illustrated in FIG. 3B, for example through a wireless Bluetooth connection, a wireless mesh network connection or a wireless WiFi network connection. Therefore, the intelligent device 200 further comprises a wireless transmission module 260. The intelligent device 200 may be in wireless connection with a mobile device 300 through the wireless transmission module 260. Moreover, an application program 311, which functions for displaying the life percentage information of the electronic device, may be installed in the mobile device 300. When the application program 311 is executed, the life percentage information of the electronic device is displayed on the display screen 310 of the mobile device 300.

In an embodiment, the history data "a" of the electronic device is stored in the storage module 230 of the intelligent device 200 according to a default schedule (e.g., at the end of the business hours every day). Alternatively, the history data "a" may be stored into the storage module 230 of the intelligent device 200 in real time whenever updated.

Figure 4:
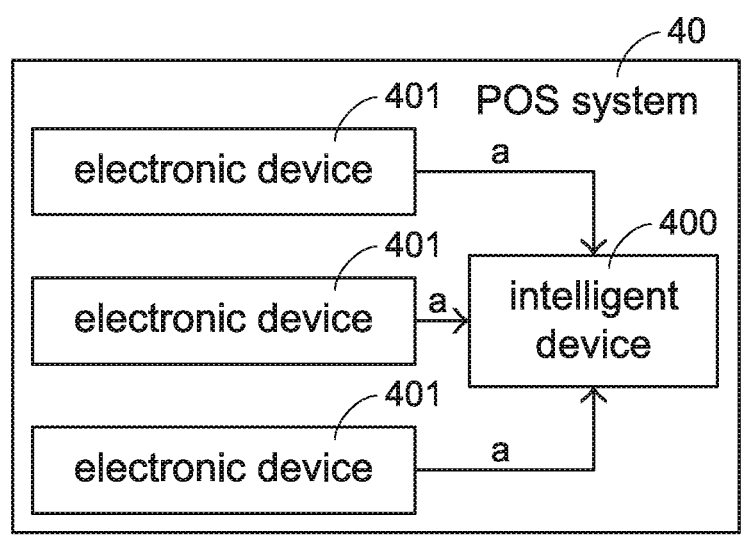
FIG. 4 is a schematic functional block diagram illustrating a POS system according to a further embodiment of the present invention.

FIG. 4 schematically illustrates a functional block diagram of a POS system according to another embodiment of the present invention, wherein the POS system 40 comprises a plurality of electronic devices 401, for example, including a power supply, a motherboard, a monitor, a printer, a hard disk drive and other peripheral devices, and the life percentage information of the POS system 40 is to be prompted and shown, for example, on the monitor or another monitor, or an external mobile device by way of an intelligent device 400 disposed in the POS system and electrically connected to the electronic devices 401. In this embodiment, the intelligent device 400 is similar to that illustrated with reference to FIG. 1, FIG. 2 and FIG. 3B except that the life percentage information it prompts and displays is derived from the history data "a" including information associated with all the above-described electronic devices. The history data "a" are processed to extract and derive life percentage information of the electronic devices, respectively. The life percentage information may be integrally displayed.

The processing of the history data "a" by the intelligent device 400 will be illustrated as follows. Firstly, the history data "a" generated by the electronic devices is received by the signal transmission module of the intelligent device 400. Then, the processing unit generates a life percentage value according to the history data "a". The life percentage value can be estimated with specified parameters based on a specified mathematic formula. Depending on the types of electronic devices 401 included in the POS system 40, different parameters and different mathematic formulae are referred to. The processing unit generates the life percentage values according to the updated history data "a" associated with the modules of the POS system 40, following a default schedule, and generates the life percentage status signal b accordingly. Moreover, according to the life percentage status signal b, the prompt displaying module prompts the user about the current life percentage information of the POS system 40. Referring to the embodiment as illustrated in FIG. 1 and FIG. 2 again, the prompt displaying module 240 comprises a row of light emitting diodes 241, e.g. five light emitting diodes. The history data "a" of the monitor 100 contains information of maintenance record, operating temperature, cumulative working time, operational brightness and/or a number of times the monitor has been cumulatively touched. The processing unit 220 uses a specified mathematic formula to calculate the life percentage value of the monitor with reference to the above-mentioned information. Afterwards, the processing unit 220 generates the life percentage status signal b in response to the life percentage value.

The life percentage of the monitor basically reflects the equivalent working time of the monitor. In an embodiment, one or more light emitting diodes 241 of the prompt displaying module 240 are turned on to indicate and show the current life percentage information on the monitor in response to the life percentage status signal b. For example, the cumulative working time of the monitor is estimated to reach 60% of the default life span, three of the five light emitting diodes 241 are turned on to prompt the user of the loss of life. In an alternative embodiment, the residual life 40% may be shown by the prompt displaying module 240 in lieu of or along with the spent life. For example, two light emitting diodes 241 of the prompt displaying module 240 are turned on, e.g. in another color, to prompt the user of the residual life. In some other embodiments, the prompt displaying module 240 comprises a plurality of light emitting diodes 241 emitting three different color lights, respectively. For example, when the processing unit 220 determines that the residual life percentage of the monitor is higher than 80%, the life percentage status signal b from the processing unit 220 triggers the prompt displaying module 240 to show green light. When it is determined that the residual life percentage of the monitor is lower than 20%, orange light is shown. When the processing unit 220 determines that the residual life percentage of the monitor is lower than 10%, red light is shown. The red light prompts the user to prepare for replacement or maintenance of the monitor. In this way, unexpected interruption of a normal operation of the electronic device for replacement or maintenance can be minimized.

It is noted that the implementation of the prompt displaying module 240 is not limited to light emitting diodes. For example, in some embodiments, the prompt displaying module 240 may be a thin film transistor liquid crystal display (TFT LCD) or a liquid crystal display module (LCM).

As mentioned above, the life percentage information may also be displayed by the mobile device 300 on the display screen 310. For example, the mobile device 300 is a smart phone, a tablet computer or a notebook computer. An application program (APP) 311 is executed by the mobile device 300. For example, two intelligent devices 200 are respectively installed in a hard disk drive and a power supply of an electronic system. The application program 311 of the mobile device 300 is automatically or manually executed to issue a read signal to the hard disk drive and the power supply. In response to the read signal, the respective life percentage status signals b are transmitted from the intelligent devices 200 disposed in the hard disk drive and the power supply to the mobile device 300. Consequently, the life percentage information of the hard disk drive and the power supply can be shown on the display screen 310 via a user interface for the user's reference.

It is understood from the above descriptions, by using an intelligent device for reading a history data of an electronic device, a life percentage information of the electronic device can be estimated and displayed. Consequently, the life percentage of the electronic device can be readily realized by the user so that necessary replacement or maintenance of the electronic device can be well prepared in advance. Furthermore, the use with a mobile device facilitates the prompting effect, and allows the life percentage information of different electronic devices to be integrated or integrally shown.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A POS system, comprising:
   a plurality of electronic device, at least a specified one of which automatically generates and updates a history data at intervals; and
   an intelligent device installed in the specified electronic device for automatically updating and showing a life percentage information of the specified electronic device according to the history data, and comprising:
   a signal transmission module electrically connected to the specified electronic device for receiving the history data therethrough;
   a processing unit in communication with the signal transmission module, generating a life percentage value according to the history data of the specified electronic device, and issuing a life percentage status signal indicative of the life percentage value;
   a storage module in communication with the processing unit for storing the history data; and
   a prompt displaying module in communication with the processing unit, visibly disposed at and uncovered by a housing of the specified electronic device for displaying the life percentage information in response to the life percentage status signal;
   wherein the prompt displaying module includes at least one light emitting diode, whose color dynamically changes with the life percentage value;
   wherein the prompt displaying module includes a row of light emitting diodes, a turned-on ratio of which changes with the life percentage value.

2. The POS system according to claim 1, further comprising a first power device and a second power device, wherein electricity to the specified electronic device is exclusively provided by the first power device, and electricity to the intelligent device is exclusively provided by the second power device.

3. The POS system according to claim 1, wherein the history data is daily updated and stored into the storage module at one or more designated time points.

4. The POS system according to claim 1, wherein the history data is updated and stored into the storage module at regular intervals.

5. The POS system according to claim 1, wherein the life percentage information indicates a spent life percentage.

6. The POS system according to claim 1, wherein the life percentage information indicates a residual life percentage.

7. The POS system according to claim 1, wherein the intelligent device further comprises a wireless transmission module in wireless connection with a mobile device, wherein the life percentage status signal is transmitted from the intelligent device to the mobile device through the wireless transmission module automatically by the intelligent device at intervals or in response to a request from the mobile device triggered by a user, so that the life percentage information of the specified electronic device is shown on the mobile device.

8. The POS system according to claim 7, wherein the wireless transmission module is in wireless connection with the mobile device through a wireless Bluetooth connection, a wireless mesh network connection or a wireless WiFi network connection.

9. A POS system, comprising:
   a plurality of electronic devices; and
   an intelligent device in communication with a specified one of the electronic devices, automatically updating and showing a life percentage information of the POS system according to a history data collected from the specified electronic device, and comprising:
   a signal transmission module in communication with the specified electronic device for receiving the history data therethrough;
   a processing unit in communication with the signal transmission module, generating a life percentage value according to the history data of the specified electronic device, and issuing a life percentage status signal according to the life percentage value; and
   a prompt displaying module in communication with the processing unit, visibly disposed for displaying the life percentage information in response to the life percentage status signal,
   wherein electricity to the specified electronic device is provided by a first power device, and electricity to the intelligent device is provided by a second power device, which is independent from the first power device, and exclusively supplies power for elements included in the intelligent device;
   wherein the prompt displaying module includes a plurality of sections for displaying respective life percentage information of the electronic devices;
   wherein the prompt displaying module displays an integrated life percentage information of the electronic devices.

* * * * *